No. 847,938. PATENTED MAR. 19, 1907.
B. M. W. HANSON.
INDICATING AND LOCKING DEVICE FOR CHANGE GEAR MECHANISMS.
APPLICATION FILED JULY 11, 1906.
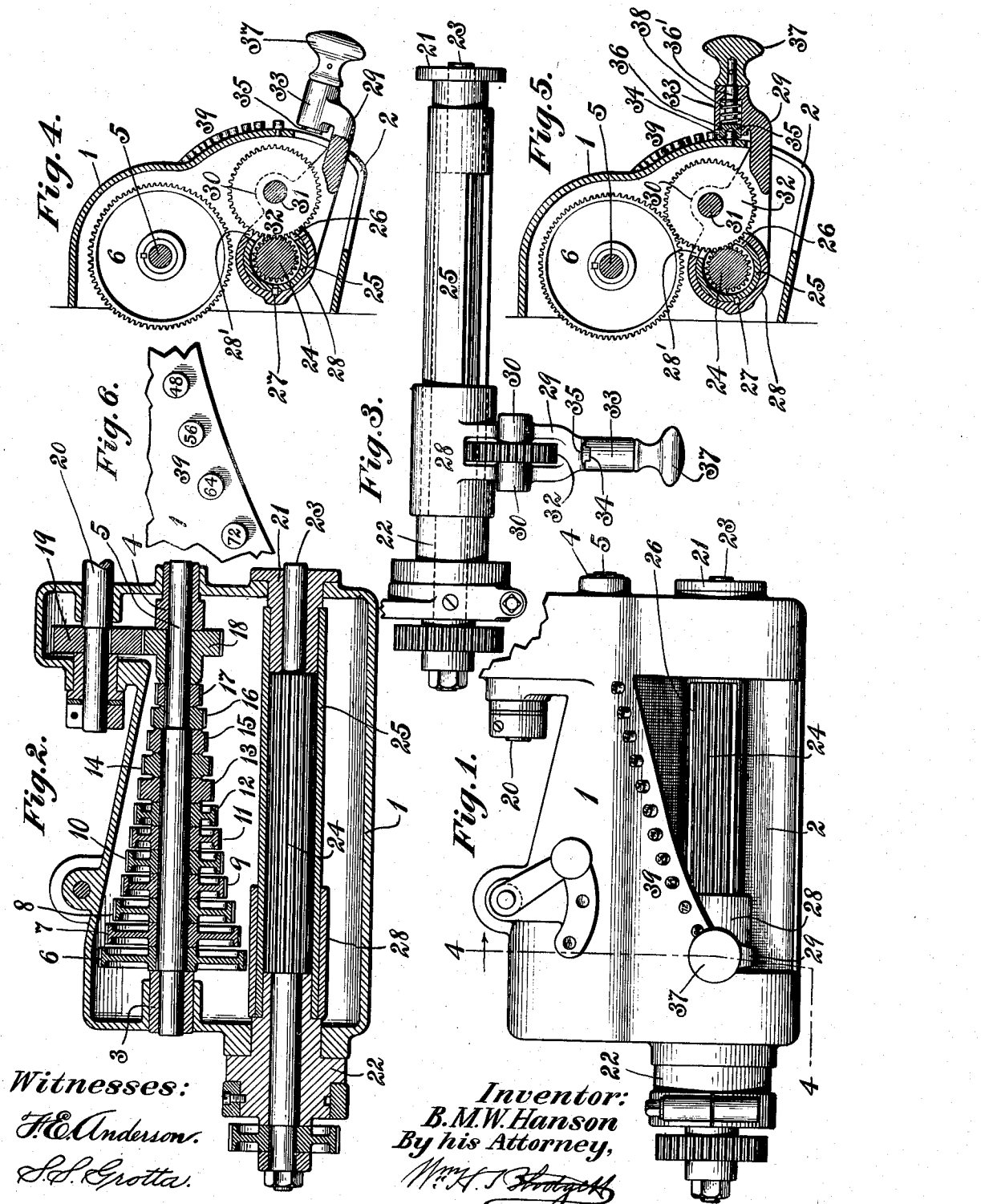
Witnesses:
F. E. Anderson.
S. S. Grotta.
Inventor:
B. M. W. Hanson
By his Attorney,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

INDICATING AND LOCKING DEVICE FOR CHANGE-GEAR MECHANISM.

No. 847,938.      Specification of Letters Patent.      Patented March 19, 1907.

Application filed July 11, 1906. Serial No. 325,607.

*To all whom it may concern:*

Be it known that I, BENGT M. W. HANSON, a citizen of Sweden, residing at Hartford, in the county of Hartford and State of Connecticut, have invented certain new and useful Improvements in Indicating and Locking Devices for Change-Gear Mechanism, of which the following is a specification.

This invention relates to change-gear mechanism for lathes and other machines, and has for its object the provision of improvements in the means employed for indicating the number of teeth of the gear of the cone with which the shiftable pinion is engaged.

A further object of the invention is the provision, in connection with the indicating means above mentioned, of an improved locking device for the shiftable pinion.

Other objects of the invention will be found disclosed in the detailed description.

In the accompanying drawings, Figure 1 is a side elevation of part of an engine-lathe, showing my improvement employed therewith. Fig. 2 is a longitudinal vertical section of Fig. 1, illustrating one kind of variable-speed gearing with which the invention may be employed. Fig. 3 is a plan view of the sleeve, barrel-pinion, and lever in bearings of which the shiftable idler-pinion hereinafter described is journaled. Figs. 4 and 5 are transverse sections each taken on line 4 4 of Fig. 1 and showing different positions of the shiftable idler-pinion; and Fig. 6 is a side view, on an enlarged scale, of part of the hood or gear-box, illustrating the manner of marking the pins or projections.

Like numerals designate similar parts throughout the several views.

Referring to the drawings, the numeral 1 indicates a hood or gear-box for containing the variable-speed mechanism, said hood projecting from the frame in a well-known manner and being cut away in front at 2 to disclose certain features of the gearing.

In bearings 3 and 4 of the gear-box is journaled a shaft 5, carrying splined thereto a cone-train composed of gears 6 to 17, inclusive, and a pinion 18 in mesh with a gear 19, rigid with a shaft 20, which may be the lead-screw shaft of the lathe.

Mounted in bearings 21 and 22, fitted in openings in the ends of the gear-box, is a shaft 23, provided with a long pinion 24 intermediate its journals and surrounding said pinion, and located between shoulders of the bearings is a sleeve 25, having a wide longitudinal slot 26 and a longitudinal groove for the reception of a spline 27, Figs. 4 and 5, carried by the hub 28 of an arm or lever 29, passing at its free end through the opening 2 in said gear-box. Journaled in bearings 30 of lever 29 is a short shaft 31, having rigidly secured thereto an idler-gear 32 in constant intermeshing engagement with the pinion 24, said idler-gear entering the slots 28' of hub 28 and 26 of sleeve 25. At its end opposite the hub 28 the lever-arm 29 is provided with a tubular bearing 33, having a notch 34 in one of its walls, said bearing receiving a plunger 35, having a recess 36 in its inner end and a stem 36' passing through a perforation in the outer end of the bearing and equipped exterior to said outer end with a knob 37. A spring 38 encircles the stem 36' between the head of the plunger and the inner wall of the end of the bearing and normally tends to force said plunger inward, as shown in Fig. 5.

Designated in a general way by 39 is a preferably curved row of separated and removable indicating-pins, (shown enlarged in Fig. 6,) said pins serving the following purpose—viz., to indicate the number of teeth in the gear of the cone with which the idler-gear 23 is engaged. For instance, if the gear 6 of the cone has eighty teeth the first pin will be marked "80," and if the gear 7 has seventy-two teeth the second pin will receive the same number, and so on throughout the series of pins, thus providing a visible index which, in connection with the usual chart-plate, will enable the necessary calculations always necessary in the class of machines to which the invention relates to be made with readiness and despatch.

In virtue of the notch or slot 34 in the inner end of the bearing 33 it will be seen that the lever-arm 29 cannot be swung upward until said notch is in position to receive the selected pin, and thus to engage the idler-gear 32 with the desired gear of the cone having the number of teeth indicated on said selected pin, when the knob 37 will be released, the plunger will snap forward, and the recess in the head thereof will immediately receive the pin and lock the parts in the position required.

While the invention is shown applied to a lathe of the kind set forth in my patent dated July 18, 1905, No. 795,222, it is distinctly to be understood that the invention is of general application and is not limited to any special arrangement of change-gear mechanism.

In the operation of the invention when for any reason it is desired to change the speed of the shaft 20 the knob 37 is grasped to withdraw the plunger 35 against the stress of spring 38, and the lever-arm 29 is then moved upward and shifted longitudinally of the gear-box 1 until the notch 34 comes into line with and receives the pin selected, when the knob is released and the spring immediately causes the plunger-head to engage said pin and lock the lever and the parts shiftable therewith securely in place.

Changes may be made in many of the constructional details of the invention without departure therefrom, and it may be employed with various locking devices and systems of change-gearing different from those shown.

Having thus described the invention, what I claim is—

1. In change-gear mechanism, the combination, with variable-speed gearing, of a pinion adapted to be engaged with any member of said gearing; means for shifting said pinion; and a series of pins or projections each marked to indicate the number of teeth in the change-gear with which it coöperates; and means coöperating with the pins for locking the shiftable pinion after it has been engaged with the selected gear.

2. The combination, with variable-speed mechanism and with an idler adapted to be engaged with any member of said mechanism, of means for rotating the idler; means for shifting said idler; a series of pins each having an indicating-mark; and a device carried by the frame of the shiftable idler, and coöperating with said pins to lock the parts when the idler is moved into engagement with a selected gear.

3. The combination, with a gear-cone, of a driving-pinion; a shiftable idler actuated by said pinion; a series of pins, each marked to indicate the number of teeth of the gear element with which it coöperates; and means carried by the frame of the idler, and adapted to secure said frame when shifted to the point selected.

4. Variable-speed mechanism comprising, a rotary shaft, a series of gears of different diameters rigid therewith; a series of pins located opposite said gears, one pin for each gear, and each pin having a mark to indicate the number of teeth in the gearing with which it coöperates; a shiftable frame; an idler journaled in said frame; and means for locking said frame to any of the pins.

5. Speed mechanism, comprising a gear-cone; a series of pins coöperating with said gear-cone, and each pin having a mark to indicate the number of teeth in the element of said gear-cone with which it coacts; a driving-pinion; a frame shiftable along and movable over said driving-pinion; an idler carried by the frame, and means also carried by the frame, and adapted to engage any of said series of pins.

6. In speed mechanism, the combination, with a frame, of a series of separated pins carried by the frame in which said mechanism is mounted, each pin having a numeral thereon to indicate the number of teeth in the elements of the speed mechanism with which the pins coöperate.

7. The combination, with a gear-box, and with a shaft journaled therein; of a gear-cone; a driven pinion also journaled in the gear-box; an idler in engagement with said driven pinion; means for shifting the idler to cause it to engage any element of the gear-cone; a series of pins, each having a mark to indicate the number of teeth in the element of the gear-cone with which it coöperates; means for engaging the pins, and thus locking the idler.

8. The combination, with framework, and with a series of separated pins, each bearing an indicating-mark, rigid with said frame, of variable-speed gearing; a shiftable idler adapted to engage any element of said variable-speed gearing; means for engaging any of the pins, and thus locking the idler when shifted; and means for driving the idler.

9. The combination, with a shiftable idler, of a device carrying said idler, and having a notched bearing; a spring-actuated plunger in said bearing, said plunger having a seat; a series of pins with any of which the seat of the plunger may be made to engage; and variable-speed gearing coöperating with the idler.

10. The combination, with a lever-arm comprising a bearing, of a driven pinion over which said arm is shiftable; a spring-actuated plunger in said bearing; the head of said plunger having a seat; an idler-gear carried by the lever-arm, and driven by said pinion; variable-speed gearing with any member of which the idler may be engaged; and a series of pins equal in number to the elements of the variable-speed gearing, and each being marked to indicate the number of teeth in the various members of said gears with any of which said idler may be shifted to engage.

In testimony whereof I affix my signature, in presence of two witnesses, this 21st day of June, 1906.

BENGT M. W. HANSON.

Witnesses:
KATHRYN T. M. O'CONNELL,
HENRY L. HUNTINGTON.